(12) United States Patent
Lee et al.

(10) Patent No.: US 12,283,120 B2
(45) Date of Patent: Apr. 22, 2025

(54) METHOD FOR DETECTING THREE-DIMENSIONAL OBJECTS IN RELATION TO AUTONOMOUS DRIVING AND ELECTRONIC DEVICE

(71) Applicant: HON HAI PRECISION INDUSTRY CO., LTD., New Taipei (TW)

(72) Inventors: Chieh Lee, New Taipei (TW); Chih-Te Lu, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 359 days.

(21) Appl. No.: 17/895,496

(22) Filed: Aug. 25, 2022

(65) Prior Publication Data

US 2023/0386231 A1 Nov. 30, 2023

(30) Foreign Application Priority Data

May 31, 2022 (CN) .......................... 202210613590.X (51) Int. Cl.
*G06T 7/70* (2017.01)
*G06T 7/50* (2017.01)
(Continued)

(52) U.S. Cl.
CPC .............. *G06V 20/653* (2022.01); *G06T 7/50* (2017.01); *G06T 7/70* (2017.01); *G06V 10/764* (2022.01);
(Continued)

(58) Field of Classification Search
CPC .............. G06V 20/653; G06V 10/764; G06V 10/7715; G06V 10/772; G06V 10/774;
(Continued)

(56) References Cited

U.S. PATENT DOCUMENTS 10,824,862 B2 * 11/2020 Qi ........................ G06F 18/2414
10,885,398 B2 * 1/2021 Wang ...................... G01S 17/42
(Continued)

OTHER PUBLICATIONS

Chen, Siheng, et al. "3d point cloud processing and learning for autonomous driving." arXiv preprint arXiv:2003.00601 (2020). (Year: 2020).*

(Continued)

*Primary Examiner* — Bobbak Safaipour
*Assistant Examiner* — Dylan J Sherrillo
(74) *Attorney, Agent, or Firm* — ScienBiziP, P.C.

(57) ABSTRACT

A method for detecting three-dimensional (3D) objects in relation to autonomous driving is applied in an electronic device. The device obtains detection images and depth images, =inputs the detection images into a trained object detection model to determine categories of objects in the detection images and two-dimensional (2D) bounding boxes of the objects. The device determines object models of the objects and 3D bounding boxes of the object models according to the object categories, and calculates point cloud data of the objects selected and distances from the depth camera to the object models. The device determines angles of rotation of the object models of the objects according to the object models of the objects and the point cloud data, and can determine respective positions of the objects in 3D space according to the distance from the depth camera to the object models, the rotation angles, and the 3D bounding boxes.

20 Claims, 4 Drawing Sheets (51) Int. Cl.
*G06V 10/764* (2022.01)
*G06V 10/77* (2022.01)
*G06V 10/772* (2022.01)
*G06V 10/774* (2022.01)
*G06V 10/94* (2022.01)
*G06V 20/58* (2022.01)
*G06V 20/64* (2022.01)

(52) U.S. Cl.
CPC ........ *G06V 10/7715* (2022.01); *G06V 10/772* (2022.01); *G06V 10/774* (2022.01); *G06V 10/95* (2022.01); *G06V 20/58* (2022.01); *G06T 2207/10028* (2013.01); *G06T 2207/20081* (2013.01); *G06T 2207/30252* (2013.01)

(58) Field of Classification Search
CPC .... G06V 10/95; G06V 20/58; G06V 2201/08; G06V 10/82; G06T 7/50; G06T 7/70; G06T 2207/10028; G06T 2207/20081; G06T 2207/30252; Y02T 10/40
See application file for complete search history.

(56) References Cited

U.S. PATENT DOCUMENTS 11,308,338 B2 *  4/2022  Yang ..................... G01S 7/4052
11,468,582 B2 * 10/2022  Yoo ........................ G06N 3/045
11,804,042 B1 * 10/2023  Alokhina ............. G06V 10/776

OTHER PUBLICATIONS

Chen, Baifan et al. "3D Fast Object Detection Based on Discriminant Images and Dynamic Distance Threshold Clustering." Sensors (Basel, Switzerland) vol. 20, 24 7221. Dec. 17, 2020, doi:10.3390/s20247221 (Year: 2020).*

* cited by examiner

METHOD FOR DETECTING THREE-DIMENSIONAL OBJECTS IN RELATION TO AUTONOMOUS DRIVING AND ELECTRONIC DEVICE

This application claims priority to Chinese Patent Application No. 202210613590.X filed on May 31, 2022, in China National Intellectual Property Administration, the contents of which are incorporated by reference herein.

FIELD

The subject matter herein generally relates to a field of computer vision technology, in particular, relates to a method for detecting three-dimensional (3D) objects in relation to autonomous driving and an electronic device.

BACKGROUND

In a field of autonomous driving, an autonomous driving system uses different types of sensors to detect objects in front of or near a vehicle and make corresponding driving decisions. Therefore, the automatic system needs to quickly and accurately detect the types and the position of the objects to ensure driving safety. At present, most 3D object detection algorithms need a large number of labeled samples to detect the categories of the objects. It is difficult to apply labels to rotation angle of the objects and regression operations are required, which takes a long time to predict the objects. In addition, most of current 3D target detection algorithms also need to accurately detect the distance between the vehicle and the objects in front of the vehicle. In the current 3D target detection algorithms, lidars or radars are often used to obtain depth information, but the cost of the lidars or radars are expensive and the field of view of the lidars or radars is relatively narrow.

BRIEF DESCRIPTION OF THE DRAWINGS

Implementations of the present disclosure will now be described, by way of embodiment, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

Figure 1:
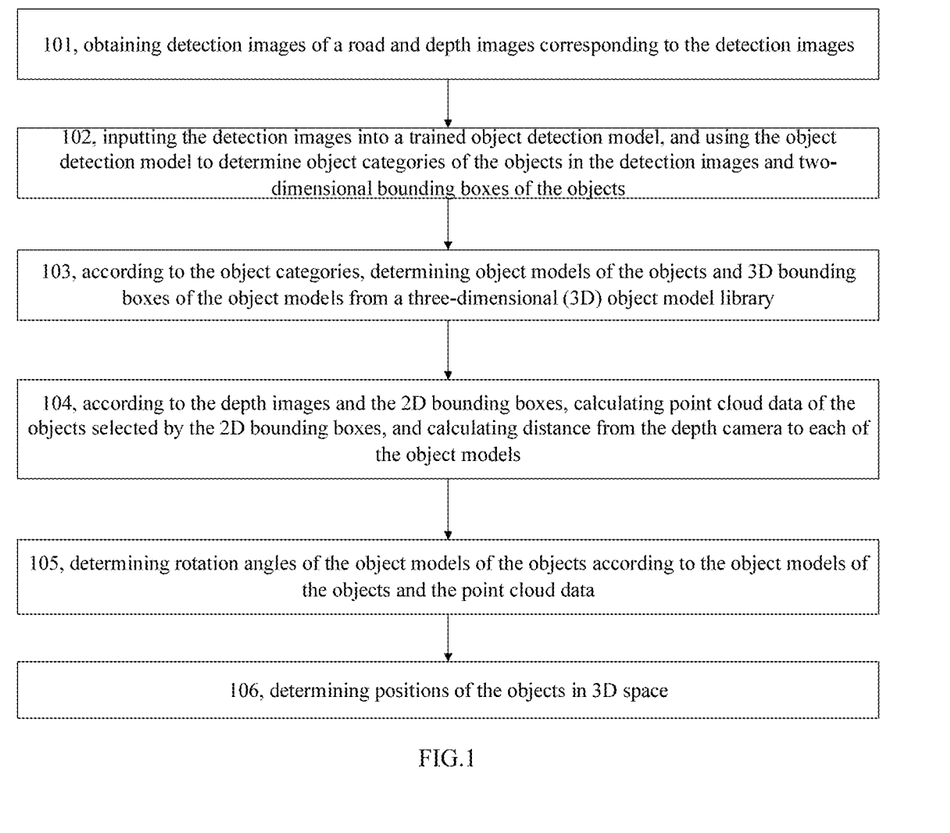
FIG. 1 is a flowchart of one embodiment of a method for detecting three-dimensional objects in relation to autonomous driving.

FIG. 1 illustrates a method for detecting three-dimensional objects in relation to autonomous driving. The method is applied in a vehicle-mounted electronic device (referring to FIG. 4). The electronic device can be any electronic product that can interact with a user, such as a personal computer, a tablet computer, a smart phone, a Personal Digital Assistant (PDA), a game console, an Internet Protocol Television (IPTV), a smart wearable device, etc.

The electronic device is a device that can automatically perform numerical calculation and/or information processing according to pre-set or stored instructions, and its hardware includes, but is not limited to, a microprocessor, an Application Specific Integrated Circuit (ASIC), a Field-Programmable Gate Array (FPGA), a Digital Signal Processor (DSP), an embedded device, etc.

In one embodiment, the electronic device may also include a network device and/or a user device. The network device includes, but is not limited to, a single network server, a server group consisting of multiple network servers, or a cloud server consisting of a large number of hosts or network servers.

A network connected to the electronic device includes, but is not limited to, the Internet, a wide area network, a metropolitan area network, a local area network, a Virtual Private Network (VPN), etc.

The method for detecting three-dimensional objects in relation to autonomous driving is provided by way of example, as there are a variety of ways to carry out the method. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 101.

At block 101, obtaining detection images of a road and depth images corresponding to the detection images.

In one embodiment, the electronic device captures images with a camera installed inside or outside a vehicle, and determines images captured in front of the vehicle as the detection images.

In one embodiment, obtaining the depth images corresponding to the detection images includes: using a depth camera to acquire the depth images. For example, the electronic device uses the depth camera mounted on the vehicle to capture images in front of the vehicle as the depth images. It should be noted that when a camera installed inside or outside the vehicle is used to capture images in front of the vehicle as the detection images, the depth camera simultaneously captures the images in front of the vehicle as the depth images, and the depth images correspond to the detection images. For example, different types of cameras may be used to capture images of the same objects in front of the vehicle to obtain the detection images and the depth images.

In one embodiment, the method for detecting three-dimensional objects in relation to autonomous driving is applied in a field of vehicle autonomous driving. In one embodiment, in the process of driving the vehicle, the method for detecting three-dimensional objects in relation to autonomous driving is applied to realize three-dimensional detection of the objects in front of the vehicle.

At block 102, inputting the detection images into a trained object detection model, and using the object detection model to determine object categories of the objects in the detection images and two-dimensional bounding boxes of the objects.

In one embodiment, the trained object detection model includes an object detection model built based on a You Only Look Once (YOLO) network. In one embodiment, the YOLO network includes a YOLOv3 network or a YOLOv5 network.

In one embodiment, the method further includes: training an object detection model and obtaining the trained object detection model. In one embodiment, training the object detection model and obtaining the trained object detection model includes: obtaining training images; input the training images into the object detection model for training, and alternately performing convolution processing and mean pooling processing on the training images and obtaining data as to feature values of the training images; using fully connected layers of the object detection model to process the feature value data to obtain the two-dimensional bounding boxes and the object categories of the objects in the training images; minimizing the loss function by adjusting parameters of the object detection model, and obtaining the trained object detection model.

In one embodiment, the parameters of the object detection model include, but are not limited to, a learning rate of the object detection model, and a number of iterations of the object detection model. In one embodiment, the loss function of the object detection model includes a mean square error loss function.

In one embodiment, obtaining the training images includes: performing a data enhancement operation on the training images and obtaining further and different training images. In one embodiment, the data enhancement operation includes, but is not limited to, flipping images, rotating images, scaling images, or cropping images. By the data augmentation operation, the quantity of training images can be effectively expanded, and the object detection model can be trained and optimized by using more training images in different scenarios (for example, the images of scene in front of the vehicle), improving the robustness of the object detection model.

In one embodiment, using fully connected layers of the object detection model to process the feature value data to obtain the two-dimensional bounding boxes and the object categories of the objects in the training image includes: using the fully connected layers of the object detection model to process the feature value data, and obtaining a number of candidate 2D bounding boxes, and individual score of each candidate 2D bounding box. In one embodiment, the scores of the number of candidate 2D bounding boxes include the scores obtained by the fully connected layers performing prediction operation on the object categories in the candidate 2D bounding box. In one embodiment, the scores of the probability values depend on the object categories which are included in the candidate 2D bounding boxes. In one embodiment, the method includes: performing Non-Maximum Suppression (NMS) operations on the number of the candidate 2D bounding boxes, and obtaining the 2D bounding boxes and object categories of the objects in the training images.

Figure 2:
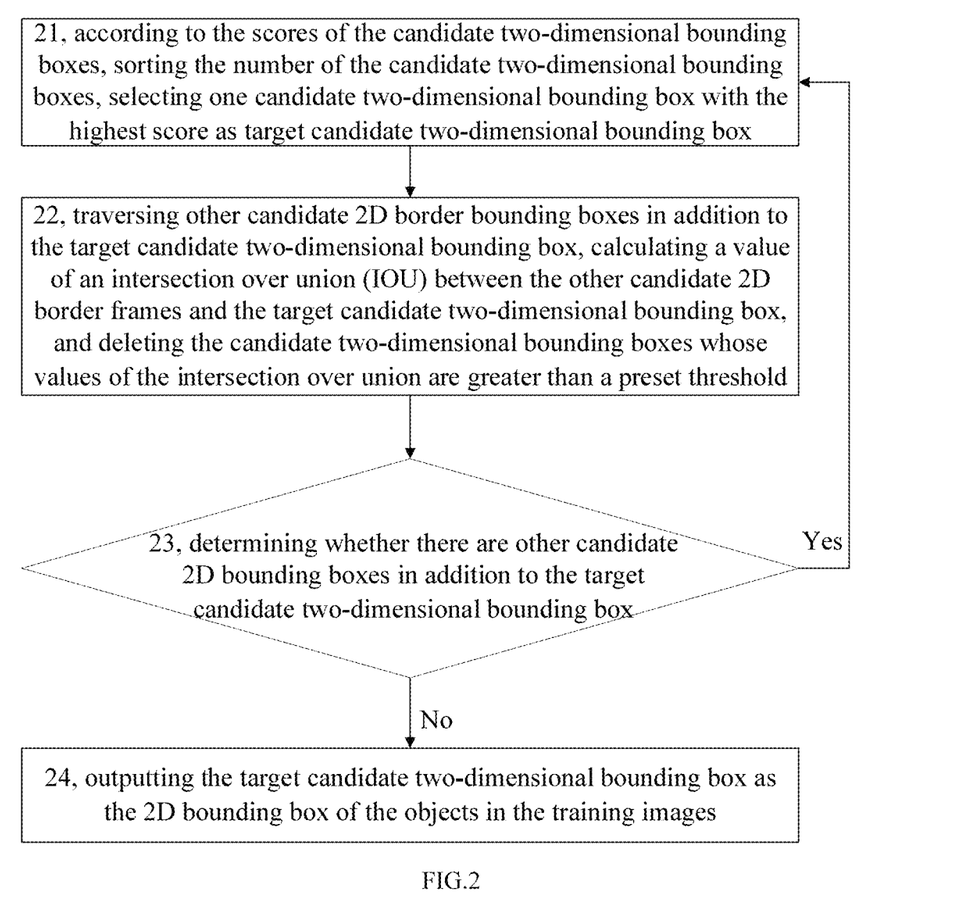
FIG. 2 is a flowchart of one embodiment of a Non-Maximum Suppression method.

FIG. 2 illustrates a method of Non-Maximum Suppression. The method of Non-Maximum Suppression can begin at block 21.

At block 21, according to the scores of the candidate two-dimensional bounding boxes, sorting the number of the candidate two-dimensional bounding boxes, and selecting one candidate two-dimensional bounding box with the highest score as a target candidate two-dimensional bounding box. In one embodiment, the candidate two-dimensional bounding boxes are the candidate two-dimensional bounding boxes of the objects in the training images.

At block 22, traversing other candidate 2D border bounding boxes in addition to the target candidate two-dimensional bounding box, calculating a value of an intersection over union (IOU) between the other candidate 2D border frames and the target candidate two-dimensional bounding box, and deleting candidate two-dimensional bounding boxes which have IoU values greater than a preset threshold. In one embodiment, the IoU is an overlap degree between the selected candidate 2D bounding boxes (i.e., the target candidate two-dimensional bounding box and other candidate 2D bounding boxes).

At block 23, determining whether there are other candidate 2D bounding boxes in addition to the target candidate two-dimensional bounding box. When there are other candidate 2D bounding boxes, block 21 is executed, and when there are no other candidate 2D bounding boxes, block 24 is executed.

At block 24, outputting the target candidate two-dimensional bounding box as the 2D bounding box of the objects in the training images.

By the above embodiments, the training of the object detection model can be completed, and the trained object detection model can be obtained. Further, the detection images are input into the trained object detection model, and the object categories of the detection images and the 2D bounding boxes are output by the trained object detection model.

At block 103, according to the object categories, determining object models of the objects and 3D bounding boxes of the object models from a three-dimensional (3D) object model library.

In one embodiment, the 3D object model library is pre-established, and the 3D object model library includes a number of the object models corresponding to different object categories, and the 3D bounding boxes of object models. In one embodiment, each of the 3D bounding boxes includes the length, width, and height of one object category corresponding to the each of the 3D bounding boxes.

Figure 3:
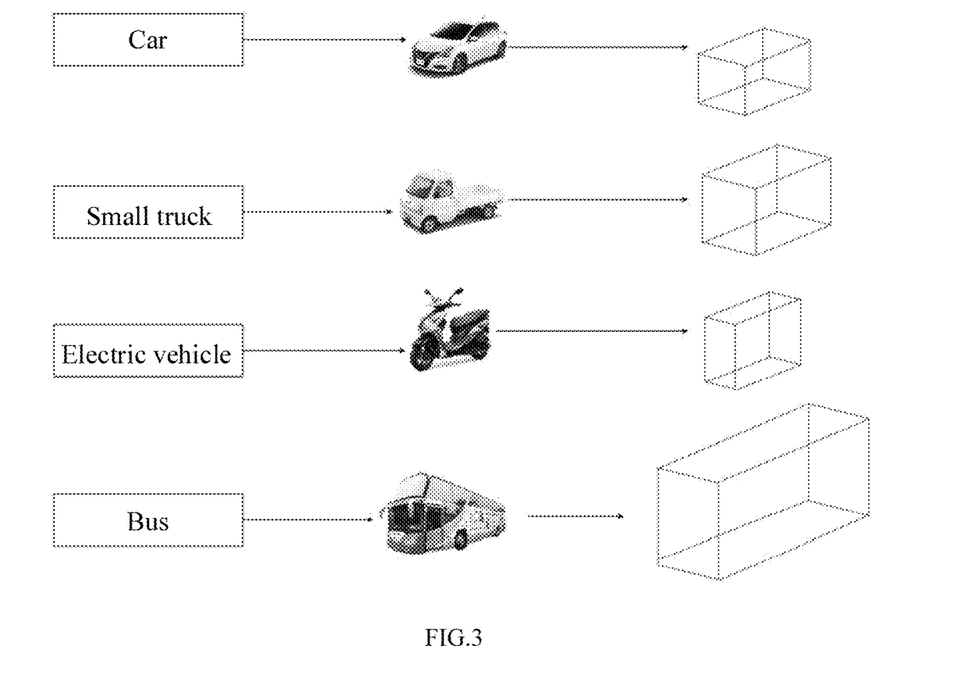
FIG. 3 is a schematic diagram of the determining of 3D bounding boxes.

In one embodiment, the electronic device searches the 3D object model library according to the object categories to determine the object models, and determines the 3D bounding boxes of the object models according to the object models. FIG. 2 illustrates a schematic diagram of the determining of 3D bounding boxes. When one object category is a car, the object model of the car is searched according to the 3D object model library, and the 3D bounding box of the car is searched according to the object model of the car. When the object category is a small truck, the object model of the small truck is searched according to the 3D object model library, and the 3D bounding box of the small truck is searched according to the object model of the small truck. When the object category is an electric vehicle, the object model of the electric vehicle is searched according to the 3D object model library, and the 3D bounding box of the electric vehicle is searched according to the object model of the electric vehicle. When the object category is a bus, the object model of the bus is searched according to the three-dimensional object model library, and the 3D bounding box of the bus is searched according to the object model of the bus. In one embodiment, the object model includes, but is not limited to, a three-dimensional model.

At block 104, according to the depth images and the 2D bounding boxes, calculating point cloud data of the objects selected by the 2D bounding boxes, and calculating distance from the depth camera to each of the object models.

In one embodiment, calculating a distance from the depth camera to each of the object models includes: obtaining the depth values of the objects selected by the 2D bounding boxes according to the depth images; determining the distance from the depth camera to each of the object models of the objects according to the depth values. In one embodiment, the depth values are obtained by a depth camera. When one depth image is obtained by using the depth camera, the depth camera displays a depth value, and the depth value is the distance from the depth camera to one object. In one embodiment, the electronic device takes the distance from the depth camera to the objects as the distance from the depth camera to the object models of the objects.

In one embodiment, calculating the point cloud data includes: obtaining a coordinate set of the objects selected by the 2D bounding boxes according to the depth images; obtaining the point cloud data according to the coordinate set and the internal and external parameter matrix transformation formula of the depth camera.

In one embodiment, the coordinate set of the objects selected by the 2D bounding boxes includes the pixel coordinate set of the objects, and the point cloud data includes the world coordinates corresponding to the coordinates in the coordinate set of the objects selected by the 2D bounding boxes. In one embodiment, the point cloud data includes data used to characterize the outline of the objects. In one embodiment, the electronic device converts the coordinates in the coordinate set of the objects into the world coordinates by the internal and external parameter matrix transformation formula:

$$\begin{bmatrix} x \\ y \\ z \end{bmatrix} = D \begin{bmatrix} \frac{f}{dx} & 0 & 0 \\ 0 & \frac{f}{dy} & 0 \\ 0 & 0 & 1 \end{bmatrix} \begin{bmatrix} x_1 \\ y_1 \\ 1 \end{bmatrix}$$

Wherein (x, y, z) are the world coordinates, which are used to represent point cloud data of the pixel coordinates, f is a focal length, D is a depth value, and (x_1, y_1) is the coordinate of the object selected by the 2D bounding boxes.

The above formula is used to convert all the coordinates in the coordinate set into the world coordinates one by one to obtain the point cloud data.

At block 105, determining rotation angles (from the point of view of parallax) of the object models of the objects according to the object models of the objects and the point cloud data.

In one embodiment, determining rotation angles of the object models of the objects according to the object models of the objects and the point cloud data includes: according to the point cloud data, obtaining first point cloud data of the outline of the objects; converting the object models of the objects into second point cloud data; matching the first point cloud data with the second point cloud data, and obtaining the rotation angles of the object models of the objects.

In one embodiment, converting the object models of the objects into the second point cloud data includes: utilizing functions in a Point Cloud Library (PCL) to read the object models of the objects and generating the point cloud data of the object models of the objects as the second point cloud data.

In one embodiment, matching the first point cloud data with the second point cloud data and obtaining the rotation angles of the object models of the objects includes: fitting points of the contour of the objects in the first point cloud data to a first plane and calculating a curvature of the first plane; fitting the points of the second point cloud data to a second plane and calculating the curvature of the second plane; calculating the difference between the curvature of the first plane and the curvature of the second plane and obtaining a curvature deviation value, and determining the rotation angles of the object models of the objects according to the curvature deviation value.

At block 106, determining positions of the objects in 3D space.

In one embodiment, the electronic device determines direction of the object models in the 3D space according to the rotation angles, determines the positions of the object models in the 3D space according to the direction of the object models in the 3D space, the distances from the depth camera to the object models, and the 3D bounding boxes of the object models. In detail, the electronic device takes the position of the object models in the 3D space as the position of the objects in the 3D space, and outputs the object categories and the positions of the objects in the 3D space. In one embodiment, the electronic device displays the object categories and the positions of the objects in the 3D space on a display screen in the form of a 3D bounding boxes.

The above embodiments are only specific embodiments of the present application, but a protection scope of the present application is not limited to these. For those of ordinary skill in the art, improvements can be made without departing from the inventive concept of the present application, but these all belong to the protection scope of the present application.

Figure 4:
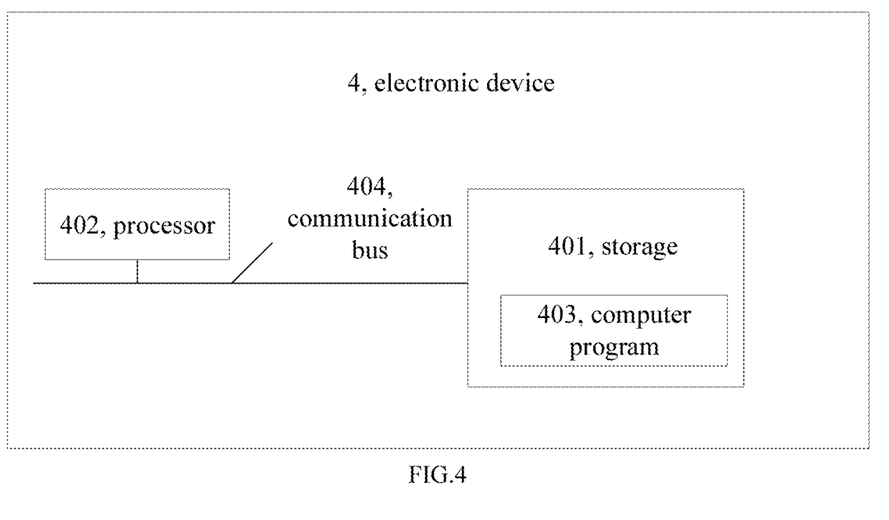
FIG. 4 is a schematic diagram of one embodiment of an electronic device.

FIG. 4 illustrates the electronic device 4. The electronic device 4 includes a storage 401, a processor 402, a computer program 403 stored in the storage 401, and at least one communication bus 404. In one embodiment, electronic device 4 can be an in-vehicle device. The in-vehicle device is provided on a vehicle, and the in-vehicle device may be an in-vehicle computer.

Those skilled in the art can understand that the schematic diagram shown in FIG. 4 is only an example of the electronic device 4, and does not constitute a limitation on the electronic device 4. Other examples may include more or less components than those shown in the drawings, or different combinations of components, or different components, for example, the electronic device 4 may also include input and output devices, network access devices, and the like.

The at least one processor 402 may be a Central Processing Unit (CPU), and may also be a general-purpose processor, a Digital Signal Processors (DSP), an Application Specific Integrated Circuit (ASIC), a Field-Programmable Gate Array (FPGA) or other programmable logic devices, discrete gate or transistor logic devices, discrete hardware components, etc. The at least one processor 402 can be a microprocessor or the at least one processor 402 can also be any conventional processor, etc. The at least one processor 402 is the control center of the electronic device 4, using various interfaces and lines to connect various parts of the entire electronic device 4.

The storage 401 can be used to store the computer program 403, and the at least one processor 402 implements the electronic program by executing the computer program 403 stored in the storage 401 and calling up the data stored in the storage 401. The storage 401 may include a stored program area and a stored data area, wherein the stored program area may store an operating system, an application program required for at least one function (such as a sound playback function, an image playback function, etc.), etc. The storage data area may store data (such as audio data) created according to the use of the electronic device 4, etc. In addition, the storage 401 may include non-volatile storage such as a hard disk, an internal memory, a plug-in hard disk, a Smart Media Card (SMC), a Secure Digital (SD) card, a Flash Card (Flash Card), at least one disk storage device, flash memory device, or other non-volatile solid state storage device.

In one embodiment, the modules/units integrated in the electronic device 4 can be stored in a computer readable storage medium if such modules/units are implemented in the form of an independent product. Thus, the present disclosure may be implemented and realized in any part of the method of the foregoing embodiments, or may be implemented by the computer program, which may be stored in the computer readable storage medium. The steps of the various method embodiments described above may be implemented by a computer program when executed by a processor. The computer program includes computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM).

The exemplary embodiments shown and described above are only examples. Even though numerous characteristics and advantages of the present disclosure have been set forth in the foregoing description, together with details of the structure and function of the present disclosure, the disclosure is illustrative only and changes may be made in the detail, including in matters of shape, size, and arrangement of the parts within the principles of the present disclosure, up to and including the full extent established by the broad general meaning of the terms used in the claims.

What is claimed is:

1. A method for detecting three-dimensional (3D) objects in relation to autonomous driving comprising:
obtaining detection images and depth images corresponding to the detection images;
inputting the detection images into a trained object detection model, and determining object categories of objects in the detection images and two-dimensional (2D) bounding boxes of the objects by using the object detection model;
determining object models of the objects and 3D bounding boxes of the object models from a 3D object model library according to the object categories;
calculating point cloud data of the objects selected by the 2D bounding boxes according to the depth images and the 2D bounding boxes, and calculating distance from the depth camera to each of the object models;
determining rotation angles of the object models of the objects according to the object models of the objects and the point cloud data, comprising: obtaining first point cloud data of an outline of the objects according to the point cloud data; converting the object models of the objects into second point cloud data; generating a first plane by fitting contour points of the objects in the first point cloud data and calculating a curvature of the first plane; generating a second plane by fitting the points of the second point cloud data and calculating a curvature of the second plane; obtaining a curvature deviation value by calculating a difference between the curvature of the first plane and the curvature of the second plane, and determining the rotation angles of the object models of the objects according to the curvature deviation value;
determining positions of the objects in 3D space according to the distance from the depth camera to the object models, the rotation angles and the 3D bounding boxes.

2. The method as claimed in claim 1, further comprising:
obtaining depth values and coordinates of the objects selected by the 2D bounding boxes according to the depth images;
determining the distance from the depth camera to each of the object models of the objects according to the depth values;
obtaining the point cloud data according to the coordinates of the objects and the internal and external parameter matrix transformation formula of the depth camera.

3. The method as claimed in claim 1, further comprising:
obtaining first point cloud data of the outline of the objects according to the point cloud data;
converting the object models of the objects into second point cloud data;
matching the first point cloud data with the second point cloud data, and obtaining the rotation angles of the object models.

4. The method as claimed in claim 1, further comprising:
obtaining training images;
building an object detection model based on a You Only Look Once (YOLO) network;
inputting the training images into the object detection model for training, and alternately performing convolution processing and mean pooling processing on the training images and obtaining feature value data of the training images;
processing the feature value data to obtain the 2D bounding boxes and the object categories of the objects in the training images by using fully connected layers of the object detection mode;
minimizing a loss function by adjusting parameters of the object detection model, and obtaining the trained object detection model.

5. The method as claimed in claim 4, further comprising:
processing the feature value data, and obtaining a plurality of candidate 2D bounding boxes by using the fully connected layers of the object detection model;
performing Non-Maximum Suppression (NMS) operations on the plurality of the candidate 2D bounding boxes, and obtaining the 2D bounding boxes and the object categories of the objects in the training images.

6. The method as claimed in claim 1, further comprising:
building the 3D object model library, wherein the 3D object model library comprises a plurality of the object models corresponding to different object categories, and the 3D bounding boxes of the object models, each of the 3D bounding boxes comprises length, width and height of one object category corresponding to the each of the 3D bounding boxes.

7. The method as claimed in claim 1, further comprising:
determining direction of the object models in the 3D space according to the rotation angles;
determining the position of the object models in the 3D space according to the direction of the object models, the distance from the depth camera to the object models, and the 3D bounding boxes of the object models.

8. The method as claimed in claim 7, further comprising:
taking the position of the object models in the 3D space as the position of the objects in the 3D space, and outputting the object categories and the position of the objects in the 3D space.

9. An electronic device comprising:
a processor; and
a non-transitory storage medium coupled to the processor and configured to store a plurality of instructions, which cause the processor to:
 obtain detection images and depth images corresponding to the detection images;
 input the detection images into a trained object detection model, and determine object categories of objects in the detection images and two-dimensional (2D) bounding boxes of the objects by using the object detection model;
 determine object models of the objects and 3D bounding boxes of the object models from a 3D object model library according to the object categories;
 calculate point cloud data of the objects selected by the 2D bounding boxes according to the depth images and the 2D bounding boxes, and calculate distance from the depth camera to each of the object models;
 determine rotation angles of the object models of the objects according to the object models of the objects and the point cloud data, comprising: obtaining first point cloud data of an outline of the objects according to the point cloud data; converting the object models of the objects into second point cloud data; generating a first plane by fitting contour points of the objects in the first point cloud data and calculating a curvature of the first plane; generating a second plane by fitting the points of the second point cloud data and calculating a curvature of the second plane; obtaining a curvature deviation value by calculating a difference between the curvature of the first plane and the curvature of the second plane, and determining the rotation angles of the object models of the objects according to the curvature deviation value;
 determine positions of the objects in 3D space according to the distance from the depth camera to the object models, the rotation angles and the 3D bounding boxes.

10. The electronic device as claimed in claim 9, wherein the plurality of instructions are further configured to cause the processor to:
 obtain depth values and coordinates of the objects selected by the 2D bounding boxes according to the depth images;
 determine the distance from the depth camera to each of the object models of the objects according to the depth values;
 obtain the point cloud data according to the coordinates of the objects and the internal and external parameter matrix transformation formula of the depth camera.

11. The electronic device as claimed in claim 9, wherein the plurality of instructions are further configured to cause the processor to:
 obtain first point cloud data of the outline of the objects according to the point cloud data;
 convert the object models of the objects into second point cloud data;
 match the first point cloud data with the second point cloud data, and obtain the rotation angles of the object models.

12. The electronic device as claimed in claim 9, wherein the plurality of instructions are further configured to cause the processor to:
 obtain training images;
 build an object detection model based on a You Only Look Once (YOLO) network;
 input the training images into the object detection model for training, and alternately perform convolution processing and mean pooling processing on the training images and obtaining feature value data of the training images;
 process the feature value data to obtain the 2D bounding boxes and the object categories of the objects in the training images by using fully connected layers of the object detection model;
 minimize a loss function by adjusting parameters of the object detection model, and obtain the trained object detection model.

13. The electronic device as claimed in claim 12, wherein the plurality of instructions are further configured to cause the processor to:
 processing the feature value data, and obtain a plurality of candidate 2D bounding boxes by use the fully connected layers of the object detection model;
 perform Non-Maximum Suppression (NMS) operations on the plurality of the candidate 2D bounding boxes, and obtain the 2D bounding boxes and the object categories of the objects in the training images.

14. The electronic device as claimed in claim 9, wherein the plurality of instructions are further configured to cause the processor to:
 build the 3D object model library, wherein the 3D object model library comprises a plurality of the object models corresponding to different object categories, and the 3D bounding boxes of the object models, each of the 3D bounding boxes comprises length, width and height of one object category corresponding to the each of the 3D bounding boxes.

15. The electronic device as claimed in claim 9, wherein the plurality of instructions are further configured to cause the processor to:

determine direction of the object models in the 3D space according to the rotation angles;

determine the position of the object models in the 3D space according to the direction of the object models, the distance from the depth camera to the object models, and the 3D bounding boxes of the object models.

16. The electronic device as claimed in claim 15, wherein the plurality of instructions are further configured to cause the processor to:

take the position of the object models in the 3D space as the position of the objects in the 3D space, and output the object categories and the position of the objects in the 3D space.

17. A non-transitory storage medium having stored thereon instructions that, when executed by at least one processor of an electronic device, causes the least one processor to execute instructions of a method for detecting three-dimensional objects in relation to autonomous driving, the method comprising:

obtaining detection images and depth images corresponding to the detection images;

inputting the detection images into a trained object detection model, and determine object categories of objects in the detection images and two-dimensional (2D) bounding boxes of the objects by using the object detection model;

determining object models of the objects and 3D bounding boxes of the object models from a 3D object model library according to the object categories;

calculating point cloud data of the objects selected by the 2D bounding boxes according to the depth images and the 2D bounding boxes, and calculating distance from the depth camera to each of the object models;

determining rotation angles of the object models of the objects according to the object models of the objects and the point cloud data, comprising: obtaining first point cloud data of an outline of the objects according to the point cloud data; converting the object models of the objects into second point cloud data; generating a first plane by fitting contour points of the objects in the first point cloud data and calculating a curvature of the first plane; generating a second plane by fitting the points of the second point cloud data and calculating a curvature of the second plane; obtaining a curvature deviation value by calculating a difference between the curvature of the first plane and the curvature of the second plane, and determining the rotation angles of the object models of the objects according to the curvature deviation value;

determining positions of the objects in 3D space according to the distance from the depth camera to the object models, the rotation angles and the 3D bounding boxes.

18. The non-transitory storage medium as claimed in claim 17, wherein the method comprising:

obtaining depth values and coordinates of the objects selected by the 2D bounding boxes according to the depth images;

determining the distance from the depth camera to each of the object models of the objects according to the depth values;

obtaining the point cloud data according to the coordinates of the objects and the internal and external parameter matrix transformation formula of the depth camera.

19. The non-transitory storage medium as claimed in claim 17, wherein the method comprising:

obtaining first point cloud data of the outline of the objects according to the point cloud data;

converting the object models of the objects into second point cloud data;

matching the first point cloud data with the second point cloud data, and obtaining the rotation angles of the object models.

20. The non-transitory storage medium as claimed in claim 17, wherein the method comprising:

obtaining training images;

building an object detection model based on a You Only Look Once (YOLO) network;

input the training images into the object detection model for training, and alternately performing convolution processing and mean pooling processing on the training images and obtaining feature value data of the training images;

process the feature value data to obtain the 2D bounding boxes and the object categories of the objects in the training images by using fully connected layers of the object detection model;

minimizing a loss function by adjusting parameters of the object detection model, and obtaining the trained object detection model.

* * * * *